(12) United States Patent
Yang

(10) Patent No.: US 8,892,809 B2
(45) Date of Patent: Nov. 18, 2014

(54) DATA COMPRESSION AND ENCODING IN A MEMORY SYSTEM

(75) Inventor: Xueshi Yang, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 336 days.

(21) Appl. No.: 13/279,914

(22) Filed: Oct. 24, 2011

(65) Prior Publication Data

US 2012/0102295 A1 Apr. 26, 2012

Related U.S. Application Data

(60) Provisional application No. 61/406,267, filed on Oct. 25, 2010, provisional application No. 61/480,268, filed on Apr. 28, 2011.

(51) Int. Cl.
| | |
|---|---|
| *G06F 12/00* | (2006.01) |
| *G06F 15/16* | (2006.01) |
| *G06F 13/12* | (2006.01) |
| *G06F 12/02* | (2006.01) |
| *G06F 12/04* | (2006.01) |

(52) U.S. Cl.
CPC ........ *G06F 12/023* (2013.01); *G06F 2212/401* (2013.01); *G06F 2212/1032* (2013.01); *G06F 12/04* (2013.01); *G06F 12/0246* (2013.01); *G06F 2212/403* (2013.01); *G06F 2212/7201* (2013.01)
USPC .................. 711/103; 711/E12.008; 709/247; 710/68

(58) Field of Classification Search
USPC .............................. 711/103; 710/68; 709/247
See application file for complete search history.

(56) References Cited

U.S. PATENT DOCUMENTS

| | | | |
|---|---|---|---|
| 4,047,151 A | 9/1977 | Rydbeck et al. | |
| 5,381,276 A | 1/1995 | Choi | |
| 5,666,560 A * | 9/1997 | Moertl et al. | 710/68 |
| 5,875,280 A | 2/1999 | Takaiwa et al. | |
| 6,266,671 B1 * | 7/2001 | Niimura | 1/1 |
| 6,747,827 B1 | 6/2004 | Bassett et al. | |
| 6,775,751 B2 * | 8/2004 | Tremaine | 711/154 |
| 7,457,431 B2 | 11/2008 | Shi et al. | |
| 2002/0150188 A1 | 10/2002 | Rudolf | |
| 2005/0088996 A1 | 4/2005 | Kawamura et al. | |
| 2006/0294448 A1 | 12/2006 | Wybenga et al. | |
| 2007/0089023 A1 | 4/2007 | Sanders | |
| 2007/0121706 A1 | 5/2007 | Nakamura et al. | |
| 2007/0171730 A1 | 7/2007 | Ramamoorthy et al. | |
| 2007/0183493 A1 | 8/2007 | Kimpe | |
| 2008/0148126 A1 | 6/2008 | Eilert et al. | |
| 2008/0163026 A1 | 7/2008 | Varnica et al. | |

(Continued)

OTHER PUBLICATIONS

Rosenthal et al., "BCH Convulutional Codes", IEEE Transactions on Information Theory, vol. 45, No. 6, Sep. 1999, 12 pages.

(Continued)

*Primary Examiner* — Reginald G. Bragdon
*Assistant Examiner* — Aracelis Ruiz

(57) ABSTRACT

Embodiments provide a method comprising receiving input data comprising a plurality of data sectors; compressing the plurality of data sectors to generate a corresponding plurality of compressed data sectors; splitting a compressed data sector of the plurality of compressed data sectors to generate a plurality of split compressed data sectors; and storing the plurality of compressed data sectors, including the plurality of split compressed data sectors, in a plurality of memory pages of a memory.

15 Claims, 10 Drawing Sheets

(56) References Cited

U.S. PATENT DOCUMENTS

| | | |
|---|---|---|
| 2009/0125790 A1 | 5/2009 | Iyer et al. |
| 2009/0150748 A1 | 6/2009 | Egner et al. |
| 2010/0023845 A1 | 1/2010 | Cheng et al. |
| 2010/0115376 A1 | 5/2010 | Shalvi et al. |
| 2010/0281340 A1 | 11/2010 | Franceschini et al. |
| 2011/0051989 A1 | 3/2011 | Gao et al. |
| 2011/0154158 A1 | 6/2011 | Yurzola et al. |
| 2012/0260009 A1* | 10/2012 | Lu et al. .......................... 710/52 |

OTHER PUBLICATIONS

Yim et al., "A Flash Compression Layer for SmartMedia Card Systems", IEEE Transactions on Consumer Electronics, vol. 50, No. 1, Feb. 2004, 6 pages.

* cited by examiner

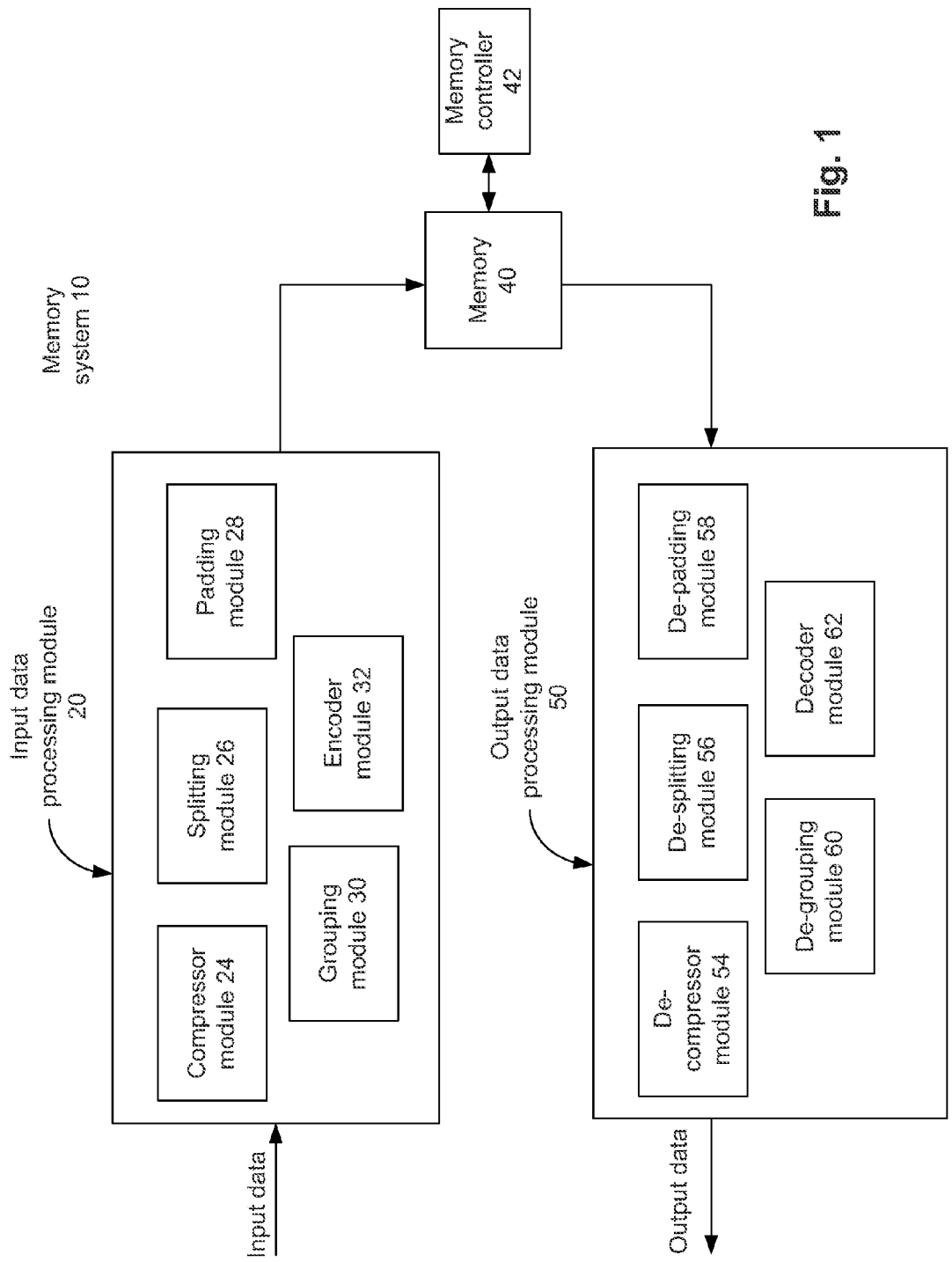

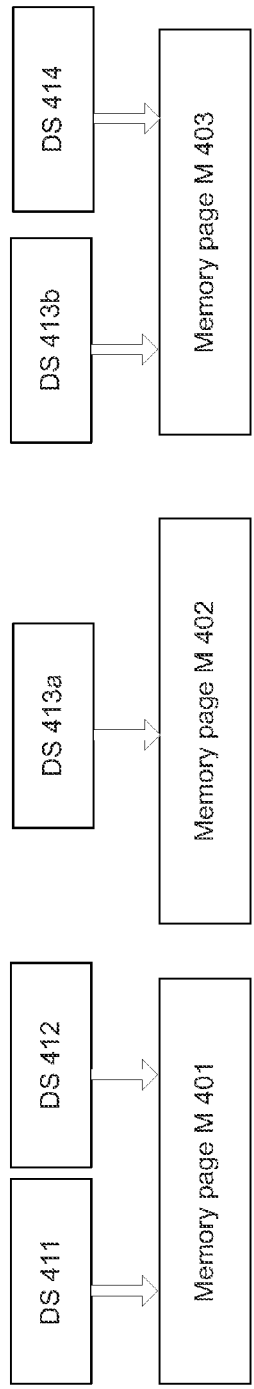

| Physical page address indexed table 600 | |
|---|---|
| Physical page address (Memory page address) | Valid logical page address counter (Valid data sector counter) |
| 401P | 2 |
| 402P | 1 |
| 403P | 2 |

← First row
← Second row
← Third row

Fig. 6a

| Physical page address indexed table 600 | |
|---|---|
| Physical page address (Memory page address) | Valid local page address counter (Valid data sector counter) |
| 401P | 2 |
| 402P | 0 |
| 403P | 1 |

← First row
← Second row
← Third row

Fig. 6b

DATA COMPRESSION AND ENCODING IN A MEMORY SYSTEM

CROSS-REFERENCES TO RELATED APPLICATIONS

The present disclosure claims priority to U.S. Provisional Patent Application No. 61/406,267 filed Oct. 25, 2010, and to U.S. Provisional Patent Application No. 61/480,268 filed Apr. 28, 2011, the entire disclosures of which are hereby incorporated by reference in their entirety except for those sections, if any, that are inconsistent with this disclosure. The present disclosure is related to U.S. patent application Ser. No. 12/757,222 filed Apr. 9, 2010, the entire disclosure of which is hereby incorporated by reference in its entirety except for those sections, if any, that are inconsistent with this disclosure.

TECHNICAL FIELD

Embodiments of the present disclosure relate to the field of memory systems, and more particularly, to data compression and encoding in a memory system.

BACKGROUND

Unless otherwise indicated herein, the approaches described in this section are not prior art to the claims in the present disclosure and are not admitted to be prior art by inclusion in this section.

During the life cycle of memory devices, for example, non-volatile memory (NVM) devices, the memory devices are subject to degradation through normal usage. From a signal processing/coding point of view, this implies that the communication channel quality degrades over time, which may eventually affect data reliability of the device. Flash devices, for example, are typically exposed to reliability issues such as read disturb, endurance, and retention as memory cells cycle through multiple read and/or write operations.

To account for these reliability issues, various communication systems utilize an error correction code (ECC) encoding scheme. To increase a reliability of storage, it is generally desirable that a code rate of an ECC encoding scheme meets a target code rate.

SUMMARY

In an embodiment, there is provided a method comprising receiving input data comprising a plurality of data sectors; compressing the plurality of data sectors to generate a corresponding plurality of compressed data sectors; splitting a compressed data sector of the plurality of compressed data sectors to generate a plurality of split compressed data sectors; and storing the plurality of compressed data sectors, including the plurality of split compressed data sectors, in a plurality of memory pages of a memory. The splitting of the compressed data sector comprises splitting the compressed data sector to generate a first split compressed data sector and a second split compressed data sector of the plurality of split compressed data sectors, and the storing of the plurality of compressed data sectors further comprises storing the first split compressed data sector in a first memory page of the plurality of memory pages; and storing the second split compressed data sector in a second memory page of the plurality of memory pages. In an embodiment, the compressed data sector is a first compressed data sector, and storing the first split compressed data sector in the first memory page further comprises grouping the first split compressed data sector with a second compressed data sector of the plurality of compressed data sectors; and storing the first split compressed data sector and the second compressed data sector in the first memory page. In an embodiment, the method further comprises encoding the plurality of compressed data sectors prior to storing the plurality of compressed data sectors. In an embodiment, the method further comprises padding one or more of the plurality of compressed data sectors prior to storing the plurality of compressed data sectors. In an embodiment, the method further comprises generating a table that, for each data sector, indicates one or more memory pages of the plurality of memory pages in which corresponding compressed data sector is stored. The splitting of the compressed data sector comprises splitting the compressed data sector to generate a first split compressed data sector and a second split compressed data sector, wherein the compressed data sector is generated from a given data sector, the storing of the plurality of compressed data sectors further comprises storing the first split compressed data sector in a first memory page of the plurality of memory pages; and storing the second split compressed data sector in a second memory page of the plurality of memory pages, and the generating comprises generating a table such that the table indicates that the given data sector is stored in the first memory page and the second memory page. In an embodiment, the method further comprises generating a table that indicates, for each of the plurality of memory pages, a number of valid compressed data sectors stored in the memory page.

In an embodiment, there is provided a method comprising receiving a plurality of data sectors; storing the plurality of data sectors in a plurality of memory pages of a memory, wherein each of the plurality of data sectors is stored in one or more memory pages of the plurality of memory pages; and generating a table, wherein generating the table comprises indicating one or more memory pages of the plurality of memory pages in which a data sector of the plurality of data sectors is stored, and repeating the indicating for each of the plurality of data sectors. In an embodiment, the method further comprises splitting a given data sector of the plurality of data sectors to generate a first split data sector and a second split data sector, wherein the storing the plurality of data sectors further comprises storing the first split data sector in a first memory page of the plurality of memory pages; and storing the second split data sector in a second memory page of the plurality of memory pages, and wherein the generating the table further comprises generating the table such that the table indicates that the given data sector is stored in the first memory page and the second memory page.

In an embodiment, there is provided a method comprising receiving a plurality of data sectors; storing the plurality of data sectors in a plurality of memory pages of a memory, wherein each of the plurality of data sectors is stored in one or more memory pages of the plurality of memory pages; and generating a table, wherein generating the table comprises indicating a number of valid data sectors stored in a memory page of the plurality of memory pages, and repeating the indicating for each of the plurality of memory pages.

In an embodiment, there is provided a memory system comprising a memory module; a compressor module configured to compress a plurality of data sectors to generate a corresponding plurality of compressed data sectors; a splitting module configured to split a compressed data sector of the plurality of compressed data sectors to generate a plurality of split compressed data sectors; and a memory controller configured to store the plurality of compressed data sectors, including the plurality of split compressed data sectors, in a plurality of memory pages of the memory module.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 1 illustrates a memory system, in accordance with various embodiments.

FIG. 4 illustrates an example of memory allocation for storage of various data sectors in various memory pages of a memory of FIG. 1, in accordance with various embodiments.

FIG. 5 illustrates a table that maps one or more data sector addresses to one or more memory page addresses for the memory allocation of FIG. 4, in accordance with various embodiments.

FIGS. 6a and 6b illustrate a table that maintains a valid logical page address counter for a corresponding physical page address, in accordance with various embodiments.

DETAILED DESCRIPTION OF DISCLOSED EMBODIMENTS

Figure 2A:
FIGS. 2a-2e illustrate an example of an operation of the memory system of FIG. 1, in accordance with various embodiments.

FIG. 1 illustrates a memory system 10, in accordance with various embodiments. The memory system 10 includes an input data processing module 20 configured to receive input data. In an embodiment, the input data is in the form of data sectors (also labeled in one or more figures as DS). For example, the input data comprises a stream of data sectors. Each data sector of the input data, for example, can have a fixed size or have a variable size. As an example, each data sector of the input data has a fixed size of 4 Kilo Bytes (KB).

The input data processing module 20 receives the input data and processes the input data for writing to a memory 40. The memory 40 can be any appropriate type of memory. In an embodiment, the memory is a silicon-based non-volatile memory (NVM), e.g., a flash memory. In an embodiment and although not illustrated in FIG. 1, the memory 40 comprises a plurality of blocks, and each block comprises a plurality of memory pages. Data is stored in various memory pages of the memory 40.

In an embodiment, data that is read back from the memory 40 is processed by an output data processing module 50, which outputs output data. In an embodiment, the output data is in the form of data sectors. For example, the output data comprises a stream of data sectors.

The input data processing module 20 comprises a compressor module 24, a splitting module 26, a padding module 28, a grouping module 30, and an encoder module 32, each of which will be discussed in more detail herein later. The output data processing module 50 comprises a de-compressor module 54, a de-splitting module 56, a de-padding module 58, a de-grouping module 60, and a decoder module 62, each of which will be discussed in more detail herein later. The memory system 10 also includes a memory controller 42 for controlling one or more operations of the memory 40, as will be discussed in more detail herein later.

The memory system 10 includes a variety of other components, which are not illustrated in FIG. 1 for the sake of illustrative clarity. For example, the memory system 10 includes appropriate components to perform write, read and/or erase operations on the memory 40, etc.

FIGS. 2a-2e illustrate an example of an operation of the memory system 10, in accordance with various embodiments. Referring to FIGS. 1 and 2a, in an embodiment, the input data comprises a stream of data sectors that includes data sectors DS A1, DS A2, DS A3 and DS A4, as illustrated in FIG. 2a.

In an embodiment, each of the data sectors DS A1, . . . , DS A4 are of fixed size, e.g., 4 KB, although in various other embodiments, the data sectors can be of any different fixed or variable sizes. In FIGS. 2a-2e, for each data component (e.g., each data sector) illustrated, a size of the data component (with a unit of KB) is illustrated in parenthesis inside the data component. For example, in FIG. 2a, the label "(4)" inside each data sector indicates that the each of the data sectors DS A1, . . . , DS A4 is 4 KB in size.

Figure 2B:
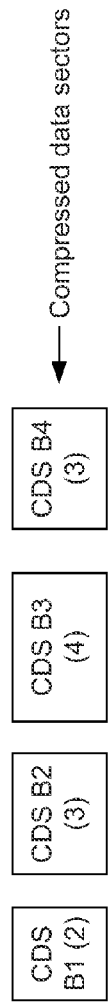

The input data processing module 20 receives the data sectors DS A1, . . . , DS A4. The compressor module 24 compresses the data sectors DS A1, . . . , DS A4, to respectively generate compressed data sectors CDS B1, . . . , CDS B4, as illustrated in FIG. 2b. The compression can be a non-lossy compression such that the compressed data sectors are capable of being decompressed at a later stage with minimal or no loss of data. Alternatively, the compression can be lossy such that certain data is lost.

The compressor module 24 compresses each of the data sectors from a first size to a second size, wherein the second size is equal to or smaller than the first size. A compression ratio for a data sector is defined as a ratio of (i) a size of the data sector after the compression and (ii) a size of the data sector before the compression. For example, the sizes of the compressed data sectors CDS B1, . . . , CDS B4 are 2 KB, 3 KB, 4 KB and 3 KB, respectively, as illustrated in FIG. 2b. Thus, for example, the compression ratio for the data sector DS A1 is 0.5 (i.e., 2/4). Also, the compression ratio for the data sector DS A3 is 1 (i.e., 4/4). That is, the compressor module 24 cannot reduce the size of the data sector DS A3 through the compression operation. The compression ratio of a data sector is based on, for example, a type of the data sector, a compression algorithm used for compression, and/or the like. For example, a data sector associated with a video file (e.g., having an MPEG format) can have a compression ratio of 1, while a data sector associated with a different file format can have a lower compression ratio.

Figure 2C:
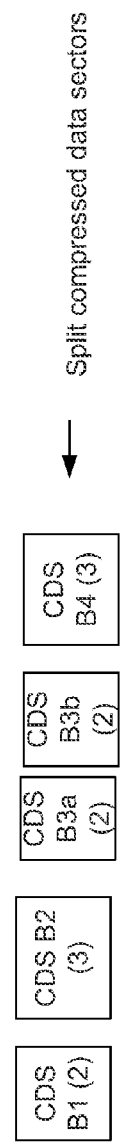

In an embodiment, the splitting module 26 selectively splits or divides one or more of the compressed data sectors CDS B1, . . . , CDS B4. For example, as illustrated in FIG. 2c, the compressed data sector CDS B3 is split in two compressed data sectors, thereby generating split compressed data sectors CDS B3a and CDS B3b. In the embodiment illustrated in FIG. 2c, the split compressed data sectors CDS B3a and CDS B3b are 2 KB each. In the embodiment illustrated in FIG. 2c, the other compressed data sectors CDS B1, CDS B2 and CDS B4 are not split by the splitting module 26.

In an embodiment, data sectors having a relatively high compression ratio (e.g., above a threshold compression ratio)

are split by the splitting module 26. In an embodiment, data sectors are split such that a threshold code rate is achieved during encoding the data sectors. Splitting of the data sectors are discussed in more detail herein later.

Figure 2D:
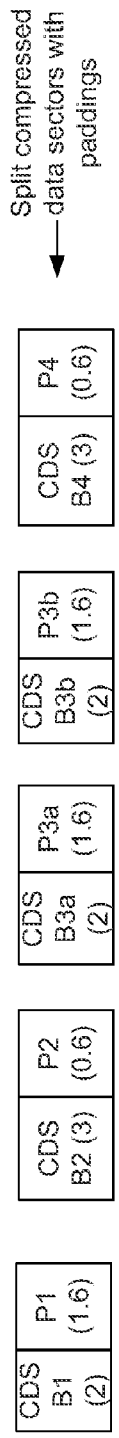

Subsequent to the selectively splitting, the compressed data sectors are padded (e.g., using the padding module 28) by appending or adding additional bits to the compressed data sectors, as illustrated in FIG. 2d. For example, the compressed data sector CDS B1 is padded using padding P1, where P1 is, for example, 1.6 KB. Similarly, paddings P2, P3a, P3b and P4 are appended to compressed data sectors CDS B2, CDS B3a, CDS B3b and CDS B4, respectively. Paddings P2, P3a, P3b and P4 are, for example, 0.6 KB, 1.6 KB, 1.6 KB and 0.6 KB, respectively. Adding a padding of appropriate length will be discussed in more detail herein later. The padding of the compressed data sectors can be performed using any appropriate method for the same.

Figure 2E:
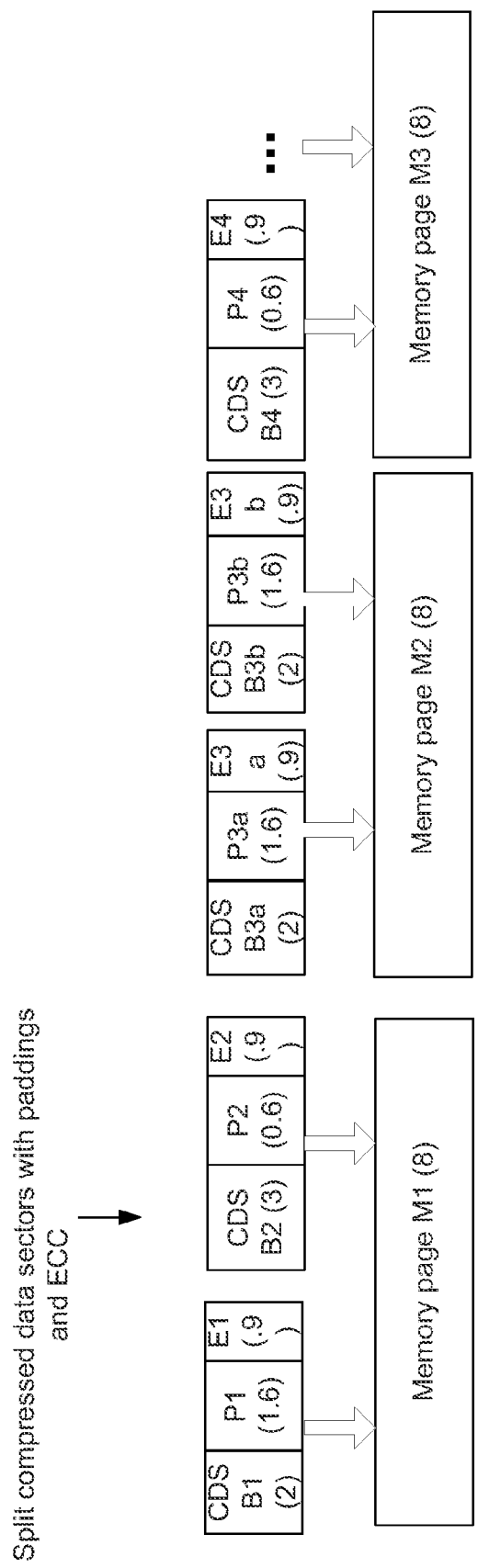

In an embodiment, the compressed data sectors, along with the added padding, are encoded using the encoder module 32. In an embodiment, the encoder module 32 uses an appropriate error correction code (ECC) encoding scheme (e.g., using parity codes, BCH codes, Reed-Solomon codes, and/or the like). During the encoding operation, a number of ECC encoding bits (e.g., which includes parity information) are generated, which are used to detect and correct errors that may occur in the subsequent retrieval of the compressed data sectors. As an example, ECC encoding bits E1 are added to the compressed data sector CDS B1, ECC encoding bits E2 are added to the compressed data sector CDS B2, and so on, as illustrated in FIG. 2e. As an example, the ECC encoding bits for each compressed data sector are 0.9 KB, as illustrated in FIG. 2e.

In an embodiment, the encoder module 32 can encode a compressed data sector using one of a plurality of encoding algorithms, based, for example, on a type of the compressed data sector, a size of the compressed data sector, and so on. As an example, the encoder module 32 encodes the compressed data sector CDS B1 using a first encoding algorithm, encodes the compressed data sector CDS B2 using a second encoding algorithm, and so on. Selective encoding of the data sectors using one or more encoding algorithms is disclosed in more detail in U.S. patent application Ser. No. 12/757,222 filed Apr. 9, 2010 and entitled "Error Correction Code," the entire disclosure of which is hereby incorporated by reference in its entirety except for those sections, if any, that are inconsistent with this disclosure.

As previously discussed, data is stored in various memory pages of the memory 40. For example, FIG. 2e illustrates three memory pages M1, M2 and M3 of the memory 40. As an example, each memory page of the memory 40 has a fixed size, e.g., 8 KB for storing data and an additional 1 KB for, for example, storing parity bits or any other appropriate information. Thus, each of the memory pages M1, M2 and M3 are of the memory 40 is 9 KB (although in other embodiments, the memory pages can be of any other appropriate size).

Referring again to FIG. 2e, once the split compressed data sectors are padded and encoded, these data sectors are written in various memory pages of the memory 40. For example, with the padding and encoding bits appended, the compressed data sector CDS B1 has a size of 4.5 KB (e.g., the compressed data sector CDS B1 is 2 KB, the padding P1 is 1.6 KB and the ECC encoding bits E1 is 0.9 KB), as illustrated in FIG. 2e. Similarly, with the padding and encoding bits appended, each of the compressed data sectors CDS B2, CDS B3a, CDS B3b and CDS B4 are 4.5 KB.

In an embodiment, the compressed data sectors CDS B1 and CDS B2 (with the respective padding and encoding bits appended) have a combined size of 9 KB, and are written to the memory page M1 of the memory 40. Similarly, the compressed data sectors CDS B3a and CDS B3b (with the respective padding and encoding bits appended) have a combined size of 9 KB, and are written to the memory page M2 of the memory 40. The compressed data sectors CDS B4 (with the respective padding and encoding bits appended) is written to memory page M3, along with one or more other compressed data sectors (not illustrated in FIG. 2e).

In an embodiment, the padding operation (e.g., in FIG. 2d) is performed such that one or more compressed data sectors, after selective splitting and encoding, are aligned and fits in the respective memory page. For example, the compressed data sectors CDS B1 and CDS B2 are 2 KB and 3 KB, respectively, and have ECC encoding bits of size 0.9 KB each. This makes each of the compressed data sectors CDS B1 and CDS B2 (along with ECC encoding bits but without any padding) to be of size 6.8 KB. To align the compressed data sectors CDS B1 and CDS B2 with the memory page M1 (e.g., which has a size of 9 KB), a combined padding of 3.2 KB is appended to the compressed data sectors CDS B1 and CDS B2 (e.g., padding of 1.6 KB for each of the compressed data sectors CDS B1 and CDS B2). In an embodiment, the size of a padding appended to a compressed data sector can be appropriately configured based on various factors, e.g., a size of the compressed data sector, a code rate of the encoding operation performed on the compressed data sector, a size of a memory page in which the compressed data sector is to be stored, sizes of one or more other data sectors which are to be stored in the same memory page in which the compressed data sector is to be stored, and/or the like.

Once data is written to the memory 40, data can be read from the memory 40 and processed by the output data processing module 50. In an embodiment, the decoder module 62 decodes the data read from the memory 40, the de-padding module 58 de-pads the decoded data (e.g., eliminates padding from the compressed data sectors that were earlier applied by the padding module 28), the de-splitting module 56 de-splits compressed data sectors that were earlier split by the splitting module 26 (e.g., combines the split compressed data sectors CDS B3a and CDS B4a), and the de-compressor module 54 decompresses the compressed data sectors that were earlier compressed by the compressor module 24. In an embodiment, operations of one or more components of the output data processing module 50 may be complementary to the operations of one or more respective components of the input data processing module 20.

FIGS. 3a-3e illustrate another example of an operation of the memory system 10, in accordance with various embodiments. Unlike FIGS. 2a-2e, in the embodiments of FIGS. 3a-3e, the compressed data sectors are selectively grouped in one or more groups, as will be discussed in more detail herein later.

Figure 3A:
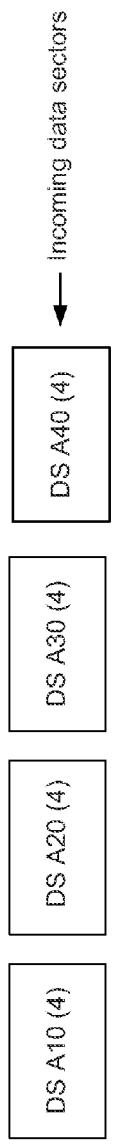
FIGS. 3a-3e illustrate another example of an operation of the memory system of FIG. 1, in accordance with various embodiments.
Figure 3B:
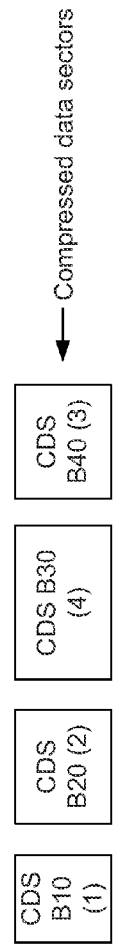

Referring to FIGS. 1 and 3a, in an embodiment, the input data comprises a stream of data sectors that includes data sectors DS A10, DS A20, DS A30 and DS A40, each of which is of fixed size, e.g., 4 KB. Similar to FIG. 2b, in FIG. 3b, the data sectors are compressed to generated compressed data sectors CDS B10, . . . , CDS B40. For example, the sizes of the compressed data sectors CDS B10, . . . , CDS B40 are 1 KB, 2 KB, 4 KB and 3 KB, respectively.

Figure 3C:
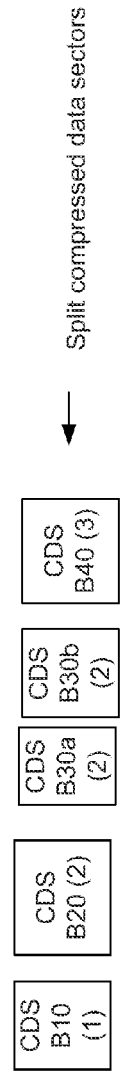

In an embodiment, the splitting module 26 selectively splits one or more of the compressed data sectors CDS B10, . . . , CDS B40. For example, as illustrated in FIG. 3c, the compressed data sector CDS B30 is split to generate split compressed data sectors CDS B30a and CDS B30b, which are, for example, 2 KB each. In the embodiment illustrated in FIG. 3c, the other compressed data sectors CDS B10, CDS B20 and CDS B40 are not split by the splitting module 26.

Figure 3D:
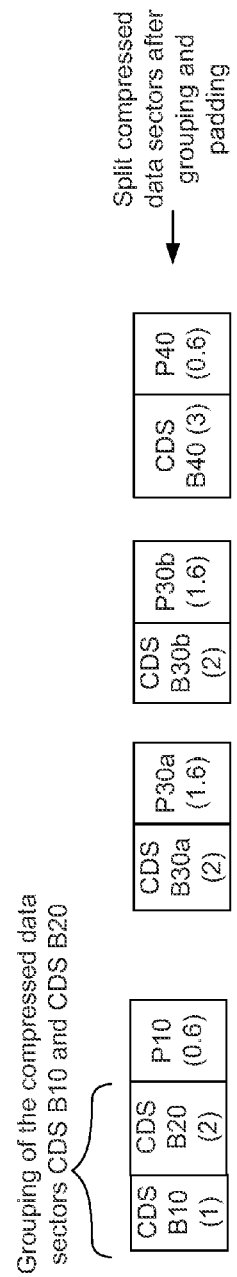

Subsequent to the selectively splitting, the compressed data sectors are selectively grouped by the grouping module 30, as illustrated in FIG. 3d. For example, the compressed data sectors CDS B10 and B20 are grouped together, such that, for example, for padding and encoding operations, the compressed data sectors CDS B10 and B20 are considered as a single compressed data sector. In another example, the compressed data sector CDS B30a is considered as one group, the compressed data sector CDS B30b is considered as another group, and the compressed data sector CDS B40 is considered as yet another group.

In an embodiment, the grouped and compressed data sectors are padded (e.g., using the padding module 28) by appending or adding additional bits to the compressed data sectors, as also illustrated in FIG. 3d. For example, the grouped compressed data sectors CDS B10 and CDS B20 are collectively padded using padding P10, where P10 is, for example, 0.6 KB. Similarly, paddings P30a, P30b and P40 are appended to the compressed data sectors CDS B30a, CDS B30b and CDS B40, respectively. Paddings P30a, P30b and P40 are, for example, 1.6 KB, 1.6 KB and 0.6 KB, respectively.

Figure 3E:
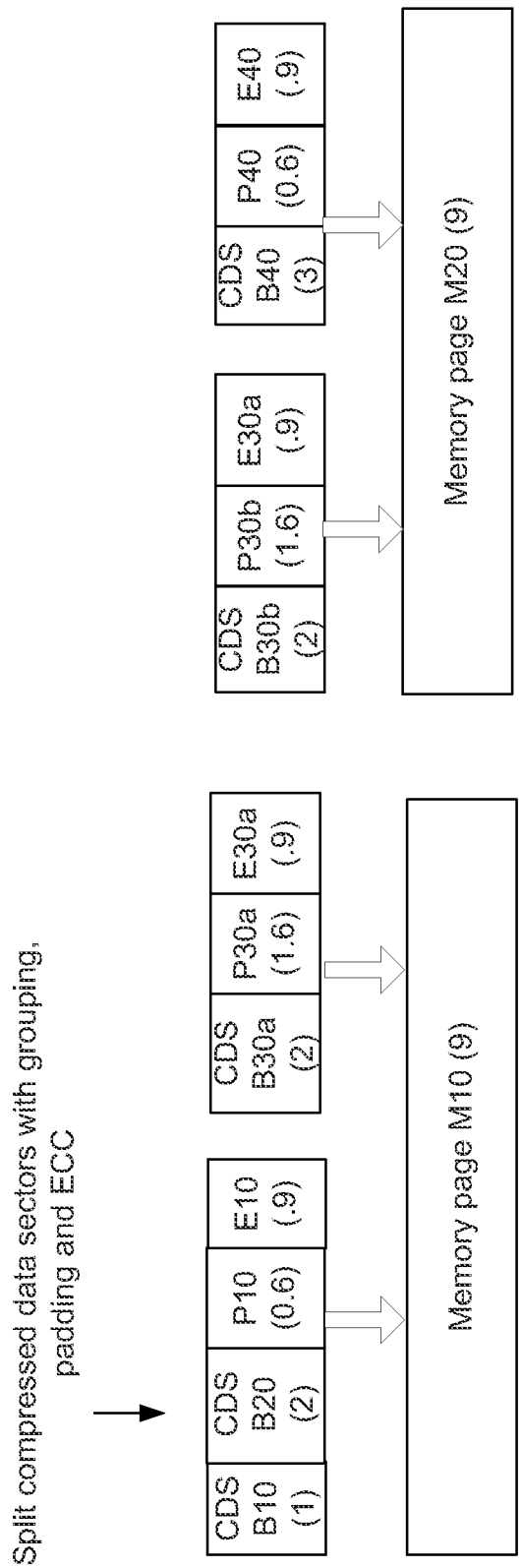

In an embodiment, subsequent to the padding operation, the compressed data sectors are encoded using the encoder module 32. As an example, ECC encoding bits E10 are collectively added to the grouped compressed data sectors CDS B10 and CDS B20, ECC encoding bits E30a are added to the compressed data sector CDS B30a, and so on, as illustrated in FIG. 3e. FIG. 3e further illustrates sizes of ECC encoding bits of compressed various data sectors, each of which are, for example, 0.9 KB. FIG. 3e also illustrates two example memory pages M10 and M20 of the memory 40, where each of the memory pages M10 and M20 has a fixed size, e.g., 9 KB (similar to the memory pages M1 and M2 of FIG. 2e).

Referring again to FIG. 3e, after encoding the compressed data sectors, these compressed data sectors are written in various pages of the memory 40. For example, with the padding and encoding bits appended, the grouped compressed data sectors CDS B10 and CDS B20 has a size of 4.5 KB, as illustrated in FIG. 3e. Similarly, with the padding and encoding bits appended, the compressed data sectors CDS B30a, CDS B30b and CDS B40 each are 4.5 KB. In an embodiment, the grouped compressed data sectors CDS B10 and CDS 20, along with the compressed data sector CDS B30a (with the respective padding and encoding bits appended) have a combined size of 9 KB, and are written to the memory page M10. Also, the compressed data sectors CDS B30b and CDS B40 (with the respective padding and encoding bits appended) have a combined size of 9 KB, and are written to the memory page M20.

In an embodiment, the grouping and/or padding operation in FIG. 3d is performed such that one or more compressed data sectors, after selective splitting, grouping, padding and encoding, are aligned and fits in the respective memory page. Moreover, grouping the two compressed data sectors CDS B10 and CDS 20 ensures that all the four data sectors DS A10, . . . , DS A40, are stored in two memory pages (e.g., instead of three memory pages) of the memory 40. For example, if the two compressed data sectors CDS B10 and CDS B20 were not grouped (e.g., as illustrated in FIG. 3d), each of the two compressed data sectors CDS B10 and CDS B20 would then have respective ECC encoding bits of, for example, 0.9 KB. In such a situation, three memory pages (e.g., instead of two) would have been needed to store the data sectors DS A10, . . . , DS A40. For example, in such a situation, it would not have been possible to store the compressed data sectors CDS B10, CDS B20 and CDS B30a in the memory page M10.

If a data sector of size XKB is encoded by the encoder module 32 to generate ECC encoding bits of YKB, then a code rate of the encoding operation is X/(X+Y). Also, as previously discussed, a compression ratio for a data sector is defined as a ratio of (i) a size of the data sector after the compression and (ii) a size of the data sector before the compression. In an embodiment, splitting a compressed data sector and/or grouping data sectors have several advantages, including, for example, improving a code rate of compressed data sectors that have relatively higher compression ratio.

As an example, the memory system 10 may have a target code rate of 0.80 or less (in general, the lower the code rate, the more powerful the encoding is, although such a powerful encoding results in a relatively higher number of ECC encoding bits). For data sectors that have relatively low compression ratios (e.g., 0.80 or less), the reduction in size resulting from the compression operation can be used for ECC encoding bits, resulting in relatively low code rates (e.g., 0.80 or less).

However, for data sectors that have relatively high compression ratios (for example, 0.80 or more, e.g., data sector DS A30 of FIG. 3a has a compression ratio of 1), relatively small or no reduction in size results from the compression operation (e.g., for a compression ratio of 1, there is no resultant reduction in size). Accordingly, the compression operation for these data sectors does not significantly contribute to reducing a size of the data sectors, and accordingly, does not facilitate achieving a code rate of 0.8 or lower for these data sectors (as the size of the data sectors are not reduced due to compression, no additional space is freed for storing the high number of ECC bits for a low code rate encoding). However, splitting these compressed data sectors facilitates grouping and/or storing the split compressed data sectors with other compressed data sectors with relatively smaller size (e.g., due to a high compression rate of the other compressed data sectors). Accordingly, such splitting and/or grouping contribute to achieving the target code rate of 0.8 or lower, as illustrated in FIGS. 3a-3e. Lowering the code rate of the data sectors results in a relatively low error rate for the memory system 10.

In a conventional memory system, a memory page generally stores one or more compressed data sectors. Also, in the conventional memory system, a compressed data sector is generally stored in a single memory page (i.e., the whole compressed data sector is stored in a single memory page, instead of partially being stored in a first memory page and partially being stored in a second memory page). Accordingly, in a conventional memory system, there is a one-to-one mapping between a compressed data sector and a memory page in which the compressed data sector is stored.

In contrast, in the memory system 10, as a result of splitting a compressed data sector in two split compressed data sectors, a first of the two split compressed data sectors can be stored in a first memory page of the memory 40, while a second of the two split compressed data sectors can be stored in a second memory page of the memory 40. Accordingly, in the memory system 10, a mapping between (i) a compressed data sector and (ii) a memory page in which the compressed data sector is stored is relatively more complex than that of a conventional memory system.

FIG. 4 illustrates an example of memory allocation for storage of various data sectors in various memory pages of the memory 40 of FIG. 1, in accordance with various embodiments. As illustrated in FIG. 4, data sectors 411 and 412 are stored in a memory page M 401 of the memory 40, split data sector 413a is stored in a memory page M 402 of the memory 40, and split data sector 413b and data sector 414 are stored in a memory page M 403 of the memory 40. Although not illustrated in FIG. 4, the various data sectors of FIG. 4 are appropriately compressed, grouped, padded and/or encoded using operations disclosed with respect to FIGS. 2a-2e and/or 3a-3e, before being stored in the memory 40. Furthermore, split data sectors 413a and 413b are formed by splitting a single data sector 413 (not illustrated in FIG. 4) using operations disclosed with respect to FIGS. 2a-2e and/or 3a-3e. Thus, the memory page M 401 stores two data sectors, the memory page M 402 stores a part of a data sector, and the memory page M 403 another part of the data sector and another full data sector. Thus, a memory page of the memory 40 can include a partial, a single and/or more than one data sectors. Also, the data sector 413 is stored across two memory pages.

In an embodiment, a data sector address associated with a data sector comprises an identifier associated with the data sector. Thus, the data sector address logically identifies the data sector (although does not point to a physical location where the data sector is stored). A data sector address of a data sector is also referred to herein as a logical page address of the data sector. For the sake of simplicity and without limiting the scope of this disclosure, a data sector address of the data sector DS 411 is assumed to be 411L, a data sector address of the data sector DS 412 is assumed to be 412L, a data sector address of the data sector DS 413 is assumed to be 413a, and so on.

In an embodiment, a memory page address associated with a memory page of the memory 40 is a physical address of the memory page (i.e., points to the physical location of the memory page). A memory page address of a memory page is also referred to herein as a physical page address of the memory page. For the sake of simplicity and without limiting the scope of this disclosure, a memory page address of the memory page M 401 is assumed to be 401P, a memory page address of the memory page M 402 is assumed to be 402P, and so on.

FIG. 5 illustrates a Table 500 that maps one or more data sector addresses (e.g., one or more logical page addresses) to one or more memory page addresses (e.g., one or more physical page addresses) for the memory allocation of FIG. 4, in accordance with various embodiments. As the Table 500 maps the addresses using the logical page addresses as an index, the Table 500 is also referred to herein as a logical page address indexed table and/or a data sector address indexed table.

The Table 500 includes three columns—a first column comprising logical page addresses, a second column comprising physical page addresses and a third column comprising additional physical page addresses. For a data sector, the Table 500 maps the logical page address of the data sector to one or more physical page addresses of one or more corresponding memory pages in which the data sector is stored.

A data sector can be stored wholly in one memory page (e.g., DS 411 stored wholly in memory page 401). Alternatively, a data sector can be split such that the data sector is stored in two memory pages (e.g., DS 413 stored in memory pages M 402 and M 403). A data sector size (e.g., before any compression) is generally less than or equal to a size of a memory page of the memory 40. Accordingly, in an embodiment, even after a data sector is split (and appropriately compressed, grouped, padded and/or encoded), the data sector can be stored in at most two memory pages. Hence, in the Table 500, a logical page address corresponds to at most two physical page addresses. However, in various other embodiments, a data sector can be stored in more than two memory pages, and the Table 500 can be modified (not illustrated in FIG. 5) such that a logical page address corresponds to more than two physical page addresses.

Referring to FIGS. 4 and 5, the data sector DS 411 is stored wholly in the memory page M 401. Accordingly, in the first row of the Table 500, the logical page address 411L (which is the data sector address associated with the data sector DS 411) is associated with the physical page address 401P (which is the memory page address of the memory page M 401). As the data sector DS 411 is not stored in any other memory page, the additional physical page address of the first row is Null. Similarly, in the second row of the Table 500, a local page address 412L corresponds to a physical page address of 401P, with a Null value for the additional physical page address (as the data sector 412 is wholly stored in the memory page M 401). Similarly, in the fourth row of the Table 500, a local page address 414L corresponds to a physical page address of 403P, with a Null value for the additional physical page address (as the data sector 414 is wholly stored in the memory page M 403).

On the other hand, the data sector 413 is stored in the memory pages M 402 and M 403, as illustrated in FIG. 4. Accordingly, in the third row of the Table 500 of FIG. 5, the logical page address 413L corresponds to the physical page addresses 402P and 403P.

In an embodiment, the Table 500 is used to identify a data sector in the memory 40. For example, if a data sector (e.g., the data sector 411) is stored in a single memory page (e.g., memory page M401), the Table 500 identifies the memory page in which the data sector is stored. Alternatively, if a data sector (e.g., the data sector 413) is stored in more than one memory pages (e.g., memory pages M 402 and M 403), the Table 500 identifies all the memory pages in which the data sector is stored. Such identification of the memory page(s) in which a data sector is stored is useful, for example, in keeping track of the data sector and/or during a read or overwrite operation of the host sector. In an embodiment, the memory controller 42 and/or any other appropriate component of the memory system 10 generates and/or updates the Table 500.

In an embodiment, the memory 40 (which may be, for example, a NAND flash memory) does not allow updating a data sector stored in a memory page. For example, referring to FIG. 4, the data sector DS 413 is stored in the memory pages M 402 and M 403. After such storage, if the data sector DS 413 needs to be updated or changed, the original location of the data sector 413 (i.e., the location of the data sector DS 413 in the memory pages M 402 and M 403) is marked as invalid, and the updated data sector 413 is stored in another location (possibly in two other memory pages that are different from the memory pages M 402 and M 403).

Accordingly, a memory page of the memory 40 can include valid and/or invalid data sectors. For example, once the data sector 413 is updated, the memory page M 402 includes only invalid data, whereas memory page M 403 includes invalid data (e.g., corresponding to an outdated copy of the data sector 413) and valid data (e.g., corresponding to the valid data sector 414).

FIG. 6a illustrates a Table 600 that maintains a valid logical page address counter for a corresponding physical page address, in accordance with various embodiments. Referring to FIGS. 4 and 6a, after storing the data sectors DS 411, . . . , DS 414, the memory page M 401 includes two valid data sectors (e.g., data sectors DS 411 and DS 412). Accordingly, in the first row of the Table 600 in FIG. 6a, the valid logical page address counter corresponding to the physical page address 401P is two. Also, the memory page M 402 includes one valid data sector (e.g., a section of the data sector DS 413). Accordingly, in the second row of the Table 600 in FIG. 6a, the valid logical page address counter corresponding to the physical page address 402P is one. Also, the memory page M 403 includes two valid data sectors (e.g., data sector DS 414 and another section of the data sector DS 413). Accordingly, in the third row of the Table 600 in FIG. 6a, the valid logical page address counter corresponding to the physical page address 403P is two.

In an embodiment, if a data sector that is stored in one or more memory pages is updated, the valid logical page address counter corresponding to each of the one or more memory pages is decremented by one. For example, after storing the data sectors DS 411, . . . , DS 414 (as illustrated in FIG. 4), it is assumed that the data sector 413 is updated. Accordingly, as previously discussed, the original location of the data sector 413 (i.e., the location of the data sector DS 413 in the memory pages M 402 and M 403) is marked as invalid (also, the updated data sector 413 is stored in another location—possibly in two other memory pages, not illustrated in any of the figures). The memory controller 42, for example, identifies, from Table 500, the memory page(s) (i.e., memory pages M 402 and M 403) that originally stored the older version of the data sector 413. Subsequently, the valid logical page address counters for the physical page addresses 402P and 403P are each decremented by one to generate an updated version of the Table 600, which is illustrated in FIG. 6b. If a valid logical page address counter for a memory page reaches zero (e.g., the memory page M 402 in the Table 600 of FIG. 6b), it indicates that no valid data sector is stored in the memory page.

Generating, maintaining and/or updating the Table 600 have several advantages. For example, Table 600 readily identifies a number of valid data sector(s) per memory page of the memory 40. As previously discussed, the memory 40 includes a plurality of blocks, each block comprising a plurality of pages. In an embodiment, the various memory pages of the memory 40 is refreshed (e.g., data included in the various pages are deleted) in the unit of blocks. For example, memory pages of an entire block are refreshed in unison. In an embodiment, based on the Table 600, a total number of valid data sectors in various memory pages of a block of the memory 40 is maintained and updated periodically. If the total number of valid data sectors in various memory pages of a block the falls below a threshold value, the entire block is refreshed (e.g., after storing the remaining valid data sectors of the memory pages of the block in memory pages of a different block). Thus, the Table 600 also helps in such periodic refreshing of one or more blocks of the memory 40.

Figure 7:
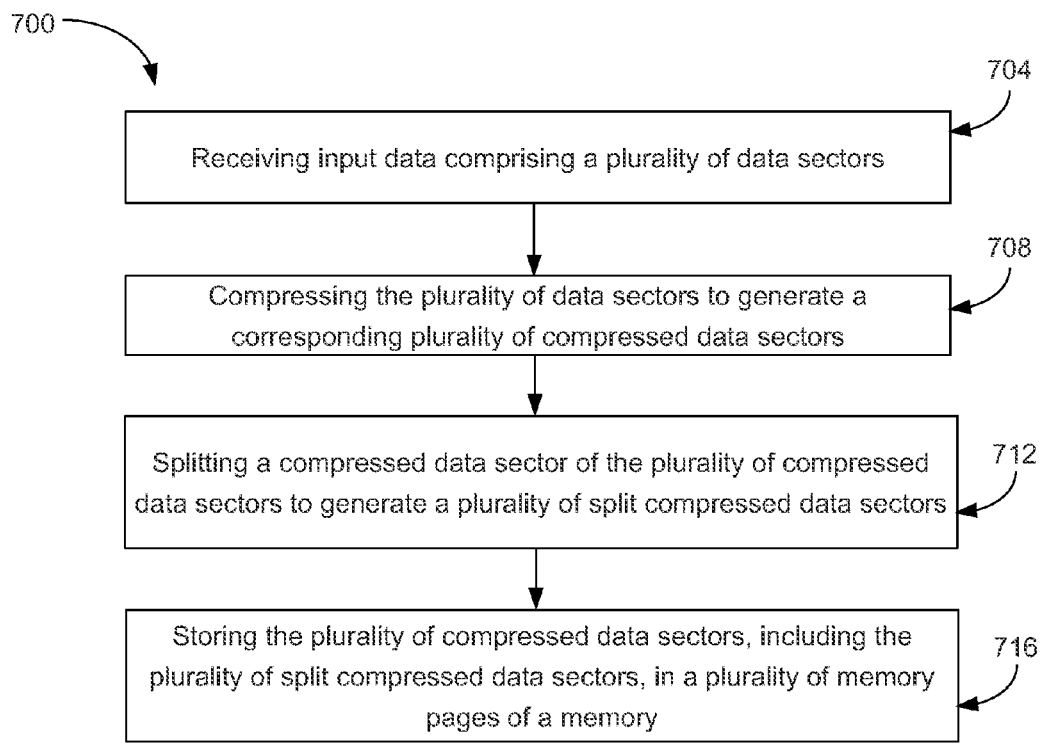
FIG. 7 illustrates an example of a method for operating the memory system of FIG. 1, in accordance with various embodiments.

FIG. 7 illustrates an example of a method 700 for operating the memory system 10 of FIG. 1, in accordance with various embodiments. At 704, the input data processing module 20 receives input data comprising a plurality of data sectors (e.g., data sectors DS A10, . . . , DS A40 of FIG. 3a). At 708, the compressor module 24 compresses the plurality of data sectors to generate a corresponding plurality of compressed data sectors (e.g., compressed data sectors CDS B10, . . . , CDS B40). At 712, the splitting module 26 splits a compressed data sector (e.g., compressed data sector CDS B30) of the plurality of compressed data sectors to generate a plurality of split compressed data sectors (e.g., split compressed data sectors CDS B30a and CDS B30b). Although not illustrated in FIG. 7, subsequent to such compressing, the compressed data sectors can be padded, encoded and/or grouped, as discussed with respect to FIGS. 2a-2e and/or 3a-3e. At 716, the memory controller 42 stores the plurality of compressed data sectors, including the plurality of split compressed data sectors, in a plurality of memory pages of the memory 40.

Figure 8:
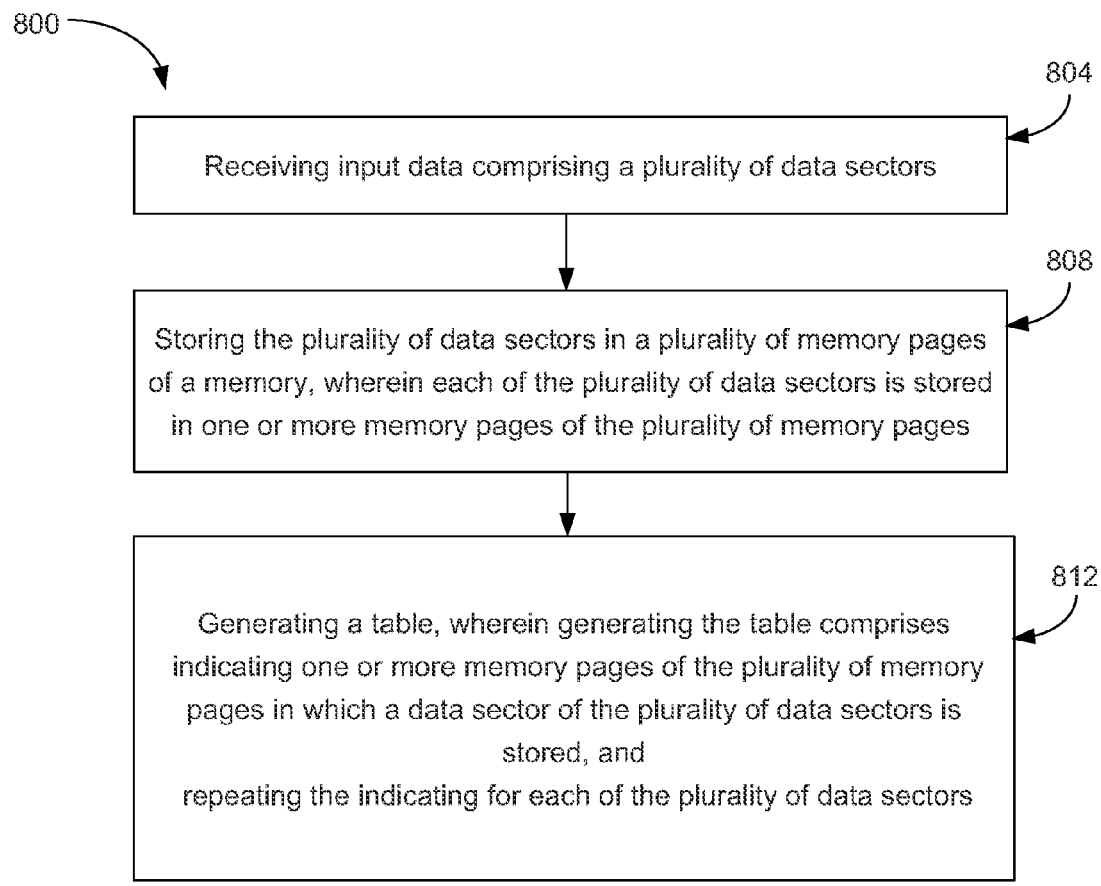
FIG. 8 illustrates an example of a method for generating the table of FIG. 5, in accordance with various embodiments.

FIG. 8 illustrates an example of a method 800 for generating the Table 500 of FIG. 5, in accordance with various embodiments. Referring to FIGS. 1, 4, 5 and 8, at 804, the input data processing module 20 receives input data comprising a plurality of data sectors (e.g., data sectors DS 411, . . . , 414 of FIG. 4). Although not illustrated in FIG. 8, subsequent to such receiving, the data sectors can be compressed, padded, split, encoded and/or grouped, as discussed with respect to FIGS. 2a-2e and/or 3a-3e. At 808, the plurality of data sectors are stored in a plurality of memory pages of the memory 40, wherein each of the plurality of data sectors is stored in one or more memory pages of the plurality of memory pages, e.g., as illustrated in FIG. 4. At 812, the Table 500 is generated (e.g., by the memory controller 42 or by any other appropriate component of the memory system 10) by indicating one or more memory pages of the plurality of memory pages in which a data sector of the plurality of data sectors is stored, and repeating the indicating for each of the plurality of data sectors. For example, Table 500 indicates that the data sector DS 411 is stored in the memory page M 401, the data sector DS 412 is stored in the memory page M 401, the data sector DS 413 is stored in the memory pages M 402 and M 403, and so on.

Figure 9:
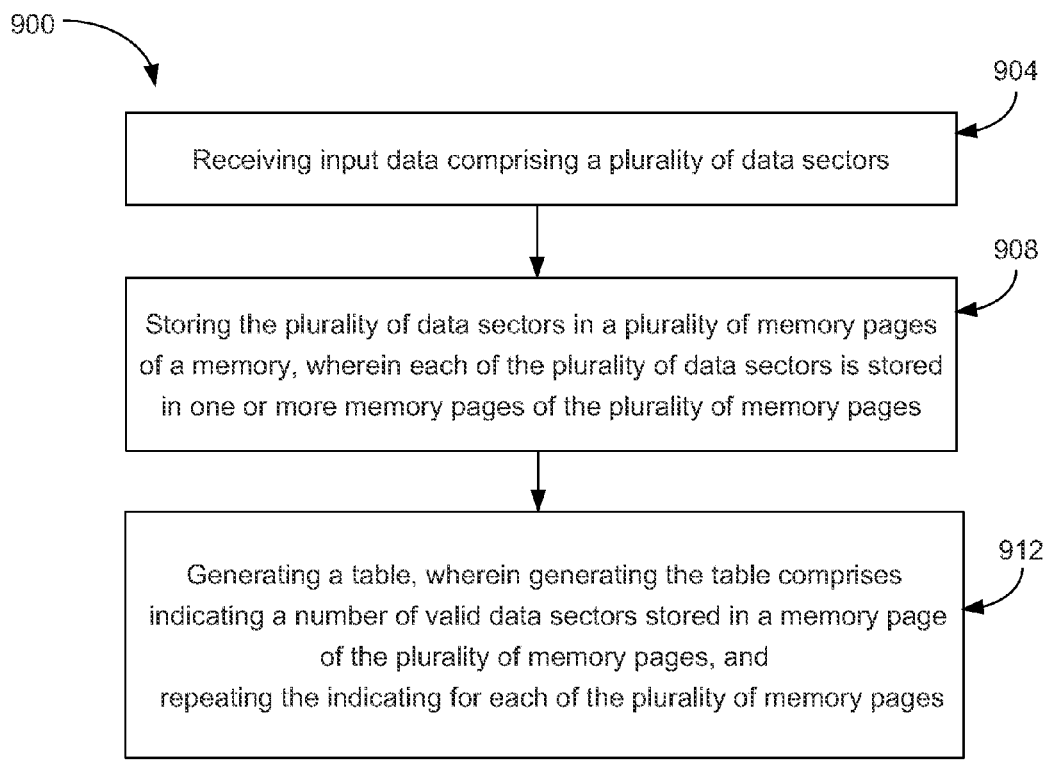
FIG. 9 illustrates an example of a method for generating the table of FIGS. 6a and 6b, in accordance with various embodiments.

FIG. 9 illustrates an example of a method 900 for generating the Table 600 of FIGS. 6a and 6b, in accordance with various embodiments. Referring to FIGS. 1, 4, 6a-6b and 9, at 904, the input data processing module 20 receives input data comprising a plurality of data sectors (e.g., data sectors DS 411, . . . , 414 of FIG. 4). Although not illustrated in FIG. 9, subsequent to such receiving, the data sectors can be compressed, padded, split, encoded and/or grouped, as discussed with respect to FIGS. 2a-2e and/or 3a-3e. At 908, the plurality of data sectors are stored in a plurality of memory pages of the memory 40, wherein each of the plurality of data sectors is stored in one or more memory pages of the plurality of memory pages, e.g., as illustrated in FIG. 4. At 912, the Table 600 is generated (e.g., by the memory controller 42 or by any other appropriate component of the memory system 10) by a indicating a number of valid data sectors stored in a memory page of the plurality of memory pages, and repeating the indicating for each of the plurality of memory pages. For example, Table 600 of FIG. 6a indicates that the memory page 401 stores two valid data sectors, the memory page 402 stores one valid data sectors, and so on.

In accordance with various embodiments, an article of manufacture may be provided that includes a storage medium having instructions stored thereon that, if executed, result in the operations described herein with respect to the methods 700, 800 and/or 900 of FIGS. 7-9 (and/or various other operations discussed in the present disclosure). In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the terms "embodiment" or "embodiments," which may each refer to one or more of the same or different embodiments. Furthermore, the terms "comprising," "including," "having," and the like, as used with respect to embodiments, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method comprising:
receiving input data comprising a plurality of data sectors;
compressing individual data sectors of the plurality of data sectors to generate a corresponding plurality of compressed data sectors;
splitting an individual compressed data sector of the plurality of compressed data sectors to generate a plurality of split compressed data sectors;
adding additional bits to individual split compressed data sectors of the plurality of split compressed data sectors to generate padded individual split compressed data sectors, wherein the number of additional bits added to the individual split compressed data sectors is based, at least in part, on sizes of individual memory pages of a memory; and
storing each of the padded individual split compressed data sectors in the individual memory pages of the memory.

2. The method of claim 1, wherein
the splitting of the individual compressed data sector comprises splitting the individual compressed data sector to generate a first split compressed data sector and a second split compressed data sector of the plurality of split compressed data sectors, and
the storing of each of the padded individual compressed data sectors further comprises:
storing the first split compressed data sector in a first memory page of the plurality of memory pages; and
storing the second split compressed data sector in a second memory page of the plurality of memory pages.

3. The method of claim 2, wherein
the individual compressed data sector is a first compressed data sector, and
storing the first split compressed data sector in the first memory page further comprises:
grouping the first split compressed data sector with a second compressed data sector of the plurality of compressed data sectors; and
storing the first split compressed data sector and the second compressed data sector in the first memory page.

4. The method of claim 3, wherein storing the first split compressed data sector in the first memory page further comprises:
grouping the first split compressed data sector with the second compressed data sector such that a threshold code rate is achieved while encoding the first split compressed data sector and the second compressed data sector.

5. The method of claim 4, wherein storing the first split compressed data sector in the first memory page further comprises:
grouping the first split compressed data sector with the second compressed data sector such that the first split compressed data sector and the second compressed data sector, after being encoded, fit in the first memory page.

6. The method of claim 3, wherein the storing the second split compressed data sector in the second memory page further comprises:
storing the second split compressed data sector in the second memory page such that no other compressed data sector is stored in the second memory page.

7. The method of claim 1, wherein splitting the individual compressed data sector further comprises:
determining that a compression ratio for the individual compressed data sector exceeds a desired code rate for encoding the individual compressed data sector; and
in response to determining that the compression ratio exceeds the desired code rate, splitting the individual compressed data sector.

8. The method of claim 1, further comprising:
encoding the plurality of compressed data sectors prior to storing each of the padded individual split compressed data sectors.

9. The method of claim 1, further comprising:
generating a table that, for each of the plurality of data sectors, indicates one or more of the memory pages of the memory in which a corresponding compressed data sector is stored.

10. The method of claim 9, wherein
the splitting of the individual compressed data sector comprises splitting the individual compressed data sector to generate a first split compressed data sector and a second split compressed data sector, wherein the individual compressed data sector is generated from a given data sector,
the storing of each of the padded individual split compressed data sectors further comprises:
storing the first split compressed data sector in a first memory page of the memory pages; and
storing the second split compressed data sector in a second memory page of the memory pages, and
the generating the table comprises generating a table such that the table indicates that a particular data sector is stored in the first memory page and the second memory page.

11. The method of claim 1, further comprising:
generating a table that indicates, for individual memory pages of the memory pages, a number of valid compressed data sectors stored in each of the individual memory pages.

12. The method of claim 11, further comprising:
changing a particular data sector of the plurality of data sectors, wherein the particular data sector is compressed to generate a first compressed data sector, and wherein the first compressed data sector is stored in a first memory page and a second memory page of the memory pages; and in response to changing the particular data sector, updating the table such that, for each of the first memory page and the second memory page, the number of valid compressed data sectors stored in each of the individual memory pages is adjusted.

13. A memory system comprising:
a memory module;
a compressor module configured to compress each of a plurality of data sectors to generate a corresponding plurality of individual compressed data sectors;
a splitting module configured to split the individual compressed data sectors to generate a plurality of split compressed data sectors;
a padding module to add additional bits to individual split compressed data sectors of the plurality of split compressed data sectors to generate padded individual split compressed data sectors, wherein the number of additional bits added to the padded individual split compressed data sectors is based, at least in part, on sizes of individual memory pages of the memory module; and
a memory controller configured to store each of the padded individual split compressed data sectors in the individual memory pages of the memory module.

14. The memory system of claim 13, further comprising:
an encoder module configured to encode the plurality of individual compressed data sectors prior to storing each of the padded individual split compressed data sectors.

15. The memory system of claim 13, wherein the plurality of split compressed data sectors includes a first split compressed data sector and a second split compressed data sector, the memory system further comprising:
a grouping module configured to group the first split compressed data sector with the second split compressed data sector of the plurality of split compressed data sectors, wherein the memory controller is configured to store the first split compressed data sector and the second split compressed data sector in a particular page of the memory pages.

\* \* \* \* \*